United States Patent
Nodera et al.

(10) Patent No.: US 6,331,584 B1
(45) Date of Patent: Dec. 18, 2001

(54) FLAME-RETARDANT POLYCARBONATE RESIN COMPOSITION AND ITS INJECTION MOLDINGS

(75) Inventors: Akio Nodera; Naoki Mitsuta, both of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/383,397

(22) Filed: Aug. 26, 1999

(30) Foreign Application Priority Data

Sep. 29, 1998 (JP) .................................. 10-274518

(51) Int. Cl.$^7$ ............... C08K 5/49; C08L 69/00
(52) U.S. Cl. ............ 524/115; 524/308; 524/310; 524/311; 524/312; 524/313; 524/377; 524/376
(58) Field of Search ................... 524/115, 312, 524/311, 308, 310, 313, 376, 377

(56) References Cited

U.S. PATENT DOCUMENTS

| | | | |
|---|---|---|---|
| 4,983,658 | * | 1/1991 | Kress et al. ............ 524/141 |
| 5,055,508 | * | 10/1991 | Ohtsubo ............... 524/128 |
| 5,061,745 | * | 10/1991 | Wittmann et al. ........ 524/139 |
| 5,240,986 | * | 8/1993 | Ohtsubo ............... 524/385 |
| 5,741,854 | * | 4/1998 | Huag ................. 525/72 |
| 5,837,757 | | 11/1998 | Nodera et al. .......... 524/87 |

FOREIGN PATENT DOCUMENTS

| | | |
|---|---|---|
| 2729485A | * 2/1976 | (DE) . |
| 0 205 192 | 12/1986 | (EP) . |
| 0 264 143 | 4/1988 | (EP) . |
| 283654 | * 9/1988 | (EP) . |
| 421536 | * 4/1991 | (EP) . |
| 0 899 294 | 3/1999 | (EP) . |
| 407179715A | * 7/1995 | (JP) . |
| 08012867A | * 1/1996 | (JP) . |
| 408239565A | * 9/1996 | (JP) . |
| WO 99/27016 | 6/1999 | (WO) . |

* cited by examiner

Primary Examiner—Margaret Medley
(74) Attorney, Agent, or Firm—Oblon, Spivak, McClelland, Maier & Neustadt, P.C.

(57) ABSTRACT

Provided are a flame-retardant polycarbonate resin composition containing a phosphate compound as the flame retardant, and also injection moldings of the composition. The composition has good moldability, and its moldings have good phosphate mold-deposits resistance and good mold releasability. In particular, when containing a styrenic resin, the composition has much better melt fluidity, and its moldings have improved impact resistance and flame retardancy. The composition comprises 100 parts by weight of a resin or resin mixture of (A) from 20 to 100% by weight of a polycarbonate resin and (B) from 0 to 80% by weight of a styrenic resin, from 1 to 30 parts by weight of (C) a phosphate compound having a melting point of not lower than 70° C., and from 0.1 to 10 parts by weight of (D) at least one member selected from the group consisting of polyglycerins, polyalkylene glycols, esters of polyglycerins, esters of polyalkylene glycols and polyesters of polycarboxylic acids with polyalcohols.

9 Claims, No Drawings

FLAME-RETARDANT POLYCARBONATE RESIN COMPOSITION AND ITS INJECTION MOLDINGS

BACKGROUND OF THE INVENTION

1. Field of the Invention

The present invention relates to a flame-retardant polycarbonate resin composition and its injection moldings. More precisely, it relates to a flame-retardant polycarbonate resin composition in which the flame retardant exhibits good flame retardancy without bleeding out of the moldings of the composition, and also to its injection moldings having the advantages of good outward appearance and good mold releasability. In particular, when combined with a styrenic resin, the composition of the invention still has good melt fluidity and good moldability and is readily formed into moldings having good impact resistance.

2. Description of the Related Art

As having the advantages of impact resistance, heat resistance and good electric properties, polycarbonate resins have many applications in various fields of, for example, office automation appliances, information appliances, electric and electronic appliances for industrial and household use, car parts and machine materials. As a rule, polycarbonate resins are self-extinguishable. However, some of their applications to office automation appliances, electric and electronic appliances for industrial and household use and others require high-level retardancy. To meet the requirement, various flame retardants are added to polycarbonate resins. One conventional method for making polycarbonate resins have flame retardancy comprises adding thereto a halogen-containing flame retardant such as a bromine compound or the like having high flame retardation capabilities alone with a flame retardation promoter such as antimony oxide or the like.

However, in view of the recent problems with the environment and of the safety, it is desired not to use halogen compounds such as bromine compounds, chlorine compounds and the like for making resins have flame retardancy. Regarding non-halogen flame retardants, various methods have been proposed of using phosphate compounds. On the other hand, there are some problems with polycarbonate resins in that they require high molding and working temperatures and their melt fluidity is low. As requiring relatively high molding and working temperatures, polycarbonate resins, especially those containing various additives are often problematic in that their thermal stability is poor while they are molded and worked and that their moldings could not exhibit their good properties. Where polycarbonate resins are molded into parts or housings of office automation appliances such as duplicators or facsimiles or those of electric and electronic appliances, the moldings shall have a complicated shape with local projections or depressions, for example having ribs or bosses therewith, and are required to be lightweight and thin-walled from the viewpoint of resources saving. Therefore, desired are polycarbonate resin compositions having increased melt fluidity, or that is, having increased injection moldability. Various polycarbonate resin compositions having increased moldability have heretofore been proposed, to which are added rubber-like polymer-modified styrenic resins in consideration of the physical properties such as impact resistance of the moldings of the compositions.

Compositions of polycarbonate resins to which are added styrenic resins such as acrylonitrile-butadiene-styrene resins (ABS resins), acrylonitrile-styrene resins (AS resins) and the like for the purpose of improving the melt fluidity of the resin compositions are known as polymer alloys, and have many applications in the field of moldings as having good heat resistance and impact resistance. Of their applications, where such polycarbonate resin compositions are used for office automation appliances, electric and electronic appliances and the like, they are required to have high flame retardancy of not lower than a predetermined level so as to ensure and increase the safety of their moldings.

To meet the requirements as above, various methods have heretofore been proposed. Concretely, JP-A 61-55145 discloses a thermoplastic resin composition comprising (A) an aromatic polycarbonate resin, (B) an ABS resin, (C) an AS resin, (D) a halogen compound, (E) a phosphate, and (E) a polytetrafluoroethylene component. JP-A 2-32154 discloses a molding polycarbonate composition with high flame retardancy and high impact resistance, comprising (A) an aromatic polycarbonate resin, (B) an ABS resin, (C) an AS resin, (D) a phosphate, and (F) a polytetrafluoroethylene component. JP-A 8-239565 discloses a polycarbonate resin composition comprising (A) an aromatic polycarbonate, (B) an impact-resistant polystyrene resin with rubber-like elastomer, (C) a non-halogen phosphate, (D) a core/shell-type, grafted rubber-like elastomer, and (E) talc.

These are all to improve the melt fluidity and therefore the moldability of polycarbonates, and to improve the impact resistance and the flame retardancy of the moldings of polycarbonates. As having such improved properties, the polycarbonate compositions proposed are formed into various practicable moldings. However, in the field of office automation appliances, electric and electronic appliances for household or industrial use, parts and housings of those appliances are required to be more lightweight and thin-walled. In particular, their shape is being more complicated to have fine projections and depressions such as ribs and bosses therewith or have a lattice structure, so that they are applicable to any complicated and large-sized appliances. In that situation, polycarbonate resins are required to have better moldability enough to meet the requirements as above.

As a rule, phosphate compounds that are liquid at room temperature and have a low melting point are used as a flame retardant for polycarbonate resins, but their amount to be added to the resins for attaining the intended flame retardancy of the resins is relatively large. Therefore, such phosphate compounds are often problematic and defective in that the resin moldings comprising them are deposited and that they lower the heat resistance and the impact resistance of the resin moldings. To solve the problems with those phosphate compounds that bleed out of the resin moldings and lower the heat resistance of the resin moldings, some methods have been proposed. For example, JP-A 6-228426 discloses a method of adding both (B) an alkyl-substituted aromatic phosphate compound having a specific structure and having a high viscosity and (C) a triphenyl phosphate or the like to (A) a polyphenylene-ether resin or a polycarbonate resin. JP-A 7-179715 discloses a flame-retardant resin composition comprising from 1 to 99 parts by weight of (A) a polycarbonate resin, from 1 to 99 parts by weight of (B) a rubber-reinforced resin, and from 0.1 to 30 parts by weight, relative to 100 parts by weight of the total of (A) and (B), of (C) an organic phosphorus compound having a melting point of not lower than 120° C. JP-A 8-12867 discloses a thermoplastic resin composition comprising 100 parts by weight of a resin mixture of 50 to 98% by weight of (A) an aromatic polycarbonate and from 2 to 50% weight of (B) an ABS resin and/or (C) an AS resin, from 0.01 to 5 parts by weight of (E) a fluorine resin and/or a silicone, and from 1 to 40 parts by weight of (E) a phosphate compound having a high melting point. In these, phosphate compounds having a high viscosity or a high melting point are used as the flame retardant to solve the problems, and they are effective in some ways.

Through our studies, however, we, the present inventors have found that, though the phosphate compounds having a high melting point could solve the problem of bleeding, they have another problem of poor dispersibility thereby having some negative influences not only on the outward appearance of resin moldings comprising them but also on the flame retardancy thereof. Especially when the phosphate compounds of that type are in compositions comprising a polycarbonate resin and a styrenic resin, we have further found that the ability of the styrenic resin to improve the melt fluidity of the compositions is poor, that the impact resistance of the moldings of the compositions is not satisfactory, and that the mold releasability of the moldings is poor and therefore must be improved.

SUMMARY OF THE INVENTION

In that situation, the object of the present invention is to provide an improved, flame-retardant polycarbonate resin composition that comprises a non-halogen flame retardant capable of highly exhibiting its flame-retarding capabilities without bleeding out of the moldings of the composition. The composition has good moldability and is formed into moldings, especially injection moldings having good flame retardancy, good impact resistance, good mechanical strength and good outward appearance and well applicable even to thin-walled and complicated office automation appliances, electric and electronic appliances for industrial and household use and car parts. The invention also provides the injection moldings of the composition.

To attain the object as above, we, the present inventors have assiduously studied various phosphate compounds and additives that may be applicable to flame-retardant polycarbonate resin compositions. As a result, we have found that, when a specific additive is selectively added to a polycarbonate resin composition containing a high-melting-point phosphate compound, especially to that further containing a rubber-modified styrenic resin, then it solves the problems noted above. On the basis of this finding, we have completed the present invention.

Specifically, the invention provides the following:

(1) A flame-retardant polycarbonate resin composition comprising 100 parts by weight of a resin or resin mixture of (A) from 20 to 100% by weight of a polycarbonate resin and (B) from 0 to 80% by weight of a styrenic resin, from 1 to 30 parts by weight of (C) a phosphate compound having a melting point of not lower than 70° C., and from 0.1 to 10 parts by weight of (D) at least one member selected from the group consisting of polyglycerins, polyalkylene glycols, esters of polyglycerins, esters of polyalkylene glycols and polyesters of polycarboxylic acids with polyalcohols.

(2) The flame-retardant polycarbonate resin composition of (1), wherein the resin mixture comprises (A) from 50 to 95% by weight of a polycarbonate resin and (B) from 5 to 50% by weight of a styrenic resin, and the styrenic resin is a rubber-modified styrenic resin.

(3) The flame-retardant polycarbonate resin composition of (1) or (2), which further contains from 0.05 to 5 parts by weight, relative to 100 parts by weight of the resin or resin mixture of (A) and (B), of (E) a fluoro-olefinic resin.

(4) The flame-retardant polycarbonate resin composition of any one of (1) to (3), which further contains from 1 to 30 parts by weight, relative to 100 parts by weight of the resin or resin mixture of (A) and (B), of (F) a rubber-like elastomer.

(5) The flame-retardant polycarbonate resin composition of (4), wherein the rubber-like elastomer (F) is a core/shell-type, grafted rubber-like elastomer.

(6) The flame-retardant polycarbonate resin composition of any one of (1) to (5), which further contains from 1 to 100 parts by weight, relative to 100 parts by weight of the resin or resin mixture of A) and (B), of (C) an inorganic filler.

(7) An injection molding of the flame-retardant polycarbonate resin composition of any one of (1) to (6).

(8) The injection molding of (7), which is for housings or parts of office automation appliances, for those of information appliances, or for those of electric and electronic appliances for household use or industrial use.

DETAILED DESCRIPTION OF THE INVENTION

The invention is described in detail hereinunder. First mentioned are the components (A) to (D) constituting the flame-retardant polycarbonate resin composition of the invention.

(A) Polycarbonate Resin (PC):

The polycarbonate resin (PC) serving as the component (A) in the flame-retardant polycarbonate resin composition of the invention is not specifically defined, and may be any and every one known in the art. Generally used are aromatic polycarbonates to be produced from diphenols and carbonate precursors. For example, used are polycarbonates as produced by reacting a diphenol and a polycarbonate a precursor in a solution method or in a melt method, such as those as produced through reaction of a diphenol and phosgene or through interesterification of a diphenol and a diphenyl carbonate.

Various diphonols are usable, including, for example, 2,2-bis(4-hydroxyphenyl)propane [bisphenol A], bis(4-hydroxyphenyl)methane, 1,1-bis (4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis (4-hydroxyphenyl) oxide, bis(4-hydroxyphenyl) sulfide, bis (4-hydroxyphenyl) sulfone, bis(4-hydroxyphenyl) sulfoxide, bis(4-hydroxyphenyl) ether, bis(4-hydroxyphenyl) ketone, etc.

As the diphenols for use herein, preferred are bis (hydroxyphenyl)alkanes, especially bisphenol A. The carbonate precursors for use in the invention include, for example, carbonyl halides, carbonyl esters, haloformates, concretely, phosgene, diphenol dihaloformates, diphenyl carbonate, dimethyl carbonate, diethyl carbonate, etc. Other diphenols such as hydroquinone, resorcinol, catechol and the like are also usable in the invention. The diphenols mentioned herein may be used either singly or as combined.

The polycarbonate resin may have a branched structure, for which the branching agent includes 1,1,1-tris(4-hydroxyphenyl)ethane, α,α',α"-tris(4-hydroxyphenyl)- 1,3, 5-triisopropylbenzene, phloroglucine, trimellitic acid, isatin-bis(o-cresol), etc. For controlling the molecular weight of the polycarbonate resin, employable are phenol, p-t-butylphenol, p-t-octyl phenol, p-cumylphenol, p-dodecyl phenol, etc.

The polycarbonate resin for use in the invention may be a copolymer having a polycarbonate moiety and a polyorganosiloxane moiety, or it may have a moiety of the copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention. In view of its mechanical strength and mold ability, the polycarbonate resin that serves as the component (A) in the invention preferably has a viscosity-average molecular weight of from 10,000 to 100,000, more preferably from 14,000 to 40,000. Also preferably, the polycarbonate resin contains substantially no halogen in its structure.

(B) Styrenic Resin:

The styrenic resin to be the component (B) in the flame-retardant polycarbonate resin composition of the invention may be a polymer as prepared through polymerization of a monomer or monomer mixture of from 20 to 100% by weight of a monvinylic aromatic monomer such as styrene, α-methylstyrene or the like, from 0 to 60% by weight of a vinyl cyanide-type monomer such as acrylonitrile, methacrylonitrile or the like, and from 0 to 50% by weight of any other vinylic monomer copolymerizable with those monomers, such as maleimide, methyl (meth)acrylate or the like. The polymer includes, for example, polystyrenes (GPPS), acrylonitrile-styrene copolymers (AS resins), etc.

As the styrenic resin, preferred are rubber-modified styrenic resins. The rubber-modified styrenic resins are preferably impact-resistant styrenic resins as produced through grafting polymerization of rubber at least with styrenic monomers. The rubber-modified styrenic resins include, for example, impact-resistant polystyrenes (HIPS) as produced through polymerization of rubber such as polybutadiene or the like with styrene; ABS resins as produced through polymerization of polybutadiene with acrylonitrile and styrene; MBS resins as produced through polymerization of polybutadiene with methyl methacrylate and styrene, etc. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight. IF the amount of the modifying rubber is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of the rubber-like polymer include polybutadiene, acrylate and/or methacrylate-having rubber, styrene-butadiene-styrene (SOBS) rubber, styrene-butadiene rubber (SBR), butadiene-acrylic rubber, isoprene rubber, isoprene-styrene rubber, isoprene-acrylic rubber, ethylene-propylene rubber, etc. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds) and even their mixtures.

(C) Phosphate Compound having a melting point of not lower than 70° C.:

The phosphate compound having a melting point of not lower than 70° C., which is used herein as the component (C), is not specifically defined. Preferably, however, it has no halogen. The phosphate compound is a crystalline one having at least one esteric oxygen atom directly bonding to the phosphorus atom therein and having a melting point of not lower than 70° C.

For example, preferred are crystalline phosphate compounds having a melting point of not lower than 70° C. and represented by the following formula (1):

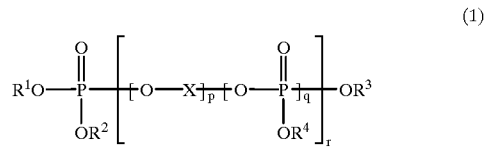

(1)

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (1), at least two of $R^1$, $R^2$ and $R^3$ are substituted phenyl groups, generally those having at least one alkyl group. Where r is 0, at least two of $R^1$, $R^2$ and $R^3$ are substituted phenyl groups, for example, those substituted by one or more alkyl groups.

In formula (1), the divalent or higher polyvalent organic group X includes, for example, alkylene groups, (substituted) phenylene groups, or may be derived from polycyclic phenols such as bisphenols. Preferred are groups derived from bisphenol A, hydroquinone, resorcinol, diphenylmethane, dihdroxydiphenyl, dihydroxynaphthalene, etc.

As specific examples of the phosphate compound having a melt point of not lower than 70° C., mentioned are resorcinol bis (di-2,6-dimethylphenyl phosphate) [m.p.: 96° C.]; hydroquinol bis (di-2,6-dimethyldiphenyl phosphate) [m.p.: 168° C.]; 4,4'-biphenylenol (di-2,6-dimethyldiphenyl phosphate) [m.p.: 182° C.]; tris(2,6-dimethylphenyl) phosphate [m.p.: 138° C.], etc.

Component (D):

The component (D) to be in the composition of the invention is a compound selected from polyglycerins, polyalkylene glycols or their esters, or polyesters of polycarboxylic acids with polyalcohols. The component (D) must not be glycerin or its ester, as glycerin and its esters could not attain the effect of the invention. The component (D) must have a molecular weight on a certain level or higher. The polyglycerins herein serving as the component (D) have at least two, but preferably at least three repetitive units. The polyalkylene glycols may have a molecular weight of from 500 to 20,000 or so, including, for example, polyethylene glycol, polypropylene glycol, polyethylene-propylene glycol, etc.

Also employable as the component (D) are esters of such polyglycerins or polyalkylene glycols with fatty acids having from 5 to 34, but preferably from 14 to 26 carbon atoms, such as caproic acid, capric acid, lauric acid, palmitic acid, stearic acid or behenic acid. The esters may he monoesters, diesters, full-esters or their mixtures. Specific examples of the component (D) include polyglycerins (having from 2 to 10 repetitive units), their esters, polyethylene glycols having a molecular weight of from 1000 to 10000 or so, etc.

Further employable as tile component (D) are polyesters of polycarboxylic acids with polyalcohols, such as those having a molecular weight of from 500 to 20000 or so. The polyalcohols may be any ordinary ones, including, for example, ethylene glycol, propylene glycol, butanediol, glycerin, trimethylpropanol, hexanetriol, etc. The polycarboxylic acids may also be any ordinary ones, including, for example, oxalic acid, malonic acid, succinic acid, adipic acid, sebacic acid, etc.

The flame-retardant polycarbonate resin composition of the invention basically comprises 100 parts by weight of a resin or resin mixture of (A) from 20 to 100% by weight, preferably from 50 to 95% by weight of a polycarbonate resin and (B) from 0 to 80% by weight, preferably from 5 to 50% by weight of a styrenic resin, from 1 to 30 parts by weight, preferably from 2 to 25 parts by weight of (C) a phosphate compound having a melting point of not lower than 70° C., and from 0.1 to 10 parts by weight, preferably from 0.2 to 5 parts by weight of (D) at least one selected from polyglycerins, polyalkylene glycols or their esters, or polyesters of polycarboxylic acids with polyalcohols.

If the proportion of the component (A), polycarbonate resin is smaller than 20% by weight in the composition, the heat resistance and the mechanical strength of the composition will be poor. The styrenic resin of the component (B) is to be in the composition so as to make the composition have the necessary melt fluidity. If its proportion is smaller than 5% by weight, the component (B) could poorly exhibit its ability to improve the moldability of the composition. The resin composition preferably comprises a resin mixture of (A) from 50 to 95%, by weight of a polycarbonate resin and (B) from 5 to 50% by weight of a styrenic resin, in which the styrenic resin (B) is preferably a rubber-modified styrenic resin.

If, in the composition, the proportion of the component (C), phosphate compound having a melting point of not lower than 70° C. is smaller than 1 part by weight, the ability of the phosphate compound therein to improve the flame retardancy of the composition will be poor. If, however, it is larger than 30 parts by weight, the heat resistance, the mechanical strength and the impact resistance of the composition will be often poor. Therefore, the proportion of phosphate compound shall be suitably determined, depending on the necessary properties of the moldings of the composition, on the moldability of the composition, and even on the proportions of the other components constituting the composition.

If the proportion of the specific command serving as by weight, the compound could poorly exhibit its ability to improve the properties of the moldings of the composition, including the phosphate bleeding resistance, the moldability, the flame retardancy, the impact strength and even the outward appearance thereof. If, however, it is larger than 10 parts by weight, the flame retardancy and the outward appearance of the moldings will also be worsened. In this connection, when glycerin monostearate or pentaerythritol tetrastearate which is similar to the specific compound is used as the component (D), it could not exhibit the excellent effect of the invention, and the reason is not clear.

The flame-retardant polycarbonate resin composition of the invention may optionally contain (E) a fluoro-olefinic resin which is generally employed in the art for preventing resin melts from dropping in fire. The fluoro-olefinic resin (E) may be a polymer or copolymer generally having a fluoro-ethylenic structure, for example, including difluoro-ethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dropping is better. The fibril-forming polytetrafluoroethylene (PTFE) is not specifically defined, but preferred is PTFF of Typo 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), CD076 (from Asahi ICI Fluoropolymers), etc.

Others except PTFE of Type 3 are also employable herein, including, for example, Argoflon F5 (from Montefluos), Polyflon MPA, FA-100 (both from Daik,in Industry), etc. These polytetrafluoroethylene (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin or resin mixture of (A) and (B). If the fluoro-olefinic resin content is smaller than 0.05 parts by weight, the resin melt-dropping prevent ability of the composition will be not enough for the intended flame retardancy of the composition. However, even if the content is larger than 5 parts by weight, the effect of the fluoro-olefinic resin added could not he augmented any more, and such a large amount of the fluoro-olefinic resin, if added to the composition, will have some negative influences on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention may further contain (F) a rubber-like elastomer which further improves the impact resistance of the moldings of the composition. The amount of the component (F) may fall between 1 and 30 parts by weight, but preferably between 2 and 20 parts by weight, relative to 100 parts by weight of the resin or resin mixture of the components (A) and (B). The amount of the rubber-like elastomer to be in the composition shall be determined, depending on the total properties (e.g., impact resistance, heat resistance, rigidity) of the intended molding. The rubber-like elastomer includes, for example, polybutadiene, polyisoprene, styrene-butadiene-styrene (SBS) rubber, styrene-butadiene rubber (SER), butadiene-acrylic rubber, isoprene-styrene rubber, isoprene-acrylic rubber, ethylene-propylene rubber, ethylene-propylene-diene rubber, siloxane rubber, etc.

Of those, preferred are powdery or granular rubber-like elastomers having a two-layered core/shell structure in which the core is of a flexible rubber material and the shell that covers the core is of a rigid resin material. After blended with a polycarbonate resin melt, the core/shell-type, grafted rubber-like elastomers of that type mostly keep their original granular condition. Since the rubber-like elastomer mostly keeps its original granular condition after having been blended with a polycarbonate resin melt, it is effective for preventing the moldings of the resin composition from being troubled by surface layer peeling.

Core/shell-type, grafted rubber-like elastomers maybe produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, n-octyl methacrylate, etc. One example of the rubber-like elastomers as obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, styrene and the like. To prepare the polymer, a polyfunctional monomer serving as a crosslinking agent, such as divinylbenzene, ethylene dimethacrylate, triallyl cyanurate, triallyl isocyanurate or the like, may be added to the polymerization system.

The vinylic monomers to be polymerized in the presence of a rubber-like polymer include, for example, aromatic vinyl compounds such as styrene, α-methylstyrene, etc.; acrylates such as methyl acrylate, ethyl acrylate, etc.; methacrylates such as methyl methacrylate, ethyl methacrylate, etc. One or more these monomers may be (co)polymerized, as combined, or may be copolymerized with any other vinylic polymers such as vinyl cyanide compounds (e.g., acrylonitrile, methacrylonitrile), vinyl esters (e.g., vinyl acetate, vinyl propionate), etc. The (co)polymerization may be effected in any known method of, for example, bulk polymerization, suspension polymerization, emulsion polymerization or the like. Preferred is emulsion polymerization.

It is desirable that the core/shell-type, grafted rubber-like elastomers thus produced in the manner mentioned above contain at least 2% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane rubber component and from 5 to 95% by weight of a polyacryl(meth)acrylate rubber component as so entangled that they are not separated from each other, and has a mean grain size of from 0.01 to 1 μm or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mirsubishi Rayon. Known are various core/shell-type, grafted rubber-like elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon), etc.

The flame-retardant polycarbonate resin composition of the invention may further contain (G) an inorganic filler which is to further increase the rigidity and the flame retardancy of the moldings of the composition. The inorganic filler includes, for example, talc, mica, kaolin, diatomaceous earth, calcium carbonate, calcium sulfate, barium sulfate, glass fibers, carbon fibers, potassium titanate fibers, etc. Of those, preferred are tabular fillers of talc, mica, etc., and fibrous fillers. Talc is a hydrous silicate of magnesium, and any commercially-available products of it are employable herein. Talc may contain a minor amount of aluminium oxide, calcium oxide and iron oxide, in addition to the essential components of silicic acid and magnesium oxide. In producing the resin composition of the invention, any talc even containing such minor components is employable. The inorganic filler such as talc for use in the invention generally has a mean grain size of from 0.1 to 50 μm, but preferably from 0.2 to 20 μm. Containing the inorganic filler as above, especially talc, the rigidity of the moldings of the invention is further increased and, in addition, the amount of the flame retardant, non-halogen phosphate to be in the composition could be reduced.

The amount of the component (G), inorganic filler may fall between 1 to 100 parts by weight, but preferably between 2 and 50 parts by weight, relative to 100 parts by weight of the resin or resin mixture of (A) and (B). If its amount is smaller than 1 part by weight, the inorganic filler added could not satisfactorily exhibit its effect of improving the rigidity and the flame retardancy of the moldings of the composition. However, if the amount is larger than 100 parts by weight, the impact resistance of the moldings will lower and the melt fluidity of the composition will lower. The amount of the inorganic filler to be in the composition shall be suitably determined, depending on the necessary properties of the moldings and the moldability of the composition, especially on the thickness of the moldings and the spiral flow length of the composition.

Apart from the essential components (A), (C) and (D) and one or more optional components selected from (B) and (E) to (G), the flame-retardant polycarbonate resin composition of the invention may further contain any other additives which are generally added to ordinary thermoplastic resins, if desired. The additives are for further improving the moldability, the outward appearance, the weather resistance and the rigidity of the moldings of the composition. For example, the additives include phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), microbicides, compatibilzers, colorants (dyes, pigments), etc. The amount of the optional additive is not specifically defined, provided that it does not interfere with the properties of the flame-retardant polycarbonate resin composition of the invention.

The method for producing the flame-retardant polycarbonate resin composition of the invention is described. The composition may be produced by mixing and kneading the components (A), (C) and (D) in a predetermined ratio as above, optionally along with the optional components (B) and (E) to (G) and with additives as above in any desired ratio. Formulating and mixing them may be effected in any known manner, for example, by pre-mixing them in an ordinary device, such as a ribbon blender, a drum tumbler or the like, followed by further kneading the resulting pre-mix in a Henschel mixer, a Banbury mixer, a single-screw extruder, a double-screw extruder, a multi-screw extruder, a cokneader or the like. The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, and it may be added to the other constituent components.

Having been prepared in the manner noted above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, press molding, vacuum molding or foaming. Preferably, the composition is pelletized in the melt-kneading manner as above, and the resulting pellets are molded into moldings through injection molding or injection compression molding. For injection molding of the composition, preferred is a gas-introducing molding method so as to prevent shrinkage cavity around the moldings and to reduce the weight of the moldings.

Moldings of the flame-retardant polycarbonate resin composition of the invention as produced through injection molding or compression injection molding have many applications in various fields and are usable, for example, as various housings and parts of office automation appliances, information appliances and electric and electronic appliances for household or industrial use, such as duplicators, facsimiles, televisions, radios, tape recorders, video decks, personal computers, printers, telephones, information terminals, refrigerators, microwave ovens, etc., and also as car parts, etc.

The invention is described in more detail with reference to the following Examples and Comparative Examples, which, however, are not intended to restrict the scope of the invention.

EXAMPLES 1 TO 6, AND COMPARITIVE EXAMPLES 1 TO 5

The components shown in Table 1 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. In Examples 2 and 4, the rubber-like elastomer serving as the component (F) is a core/shell-type, grafted rubber-like elastomer, and in Example 6, it is SBS. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 80° C. for 12 hours, and then molded into test pieces through injection molding at 260° C., for which the mold temperature was 60° C. Apart from those, the pellets were molded in a releasability testing mold to produce box samples having a size of 80 mm×100 mm×40 mm (depth) and a wall thickness of 3 mm, at a draft of 0 (zero) under the same condition as above. The releasability of the samples from the mold and also the outward appearance of the samples released from the mold were checked. The test pieces prepared above were tested for their properties. The data of those samples and test pieces thus checked and tested are all in Table 1.

The materials used for producing the test samples, and the methods for testing the samples are mentioned below.
(A) Polycarbonate resin:
PC: Toughlon A1900 (from Idemitsu Petrochemical).
This is a bisphenol A polycarbonate resin having MI of 20 g/10 min (at 300° C. under a load of 1.2 kg) and a viscosity-average molecular weight of 19,000.

(B) Styrenic resin:
HIPS: Idemitsu PSIT44 (impact-resistant polystyrene resin from Idemitsu Petrochemical).
This is a polystyrene-grafted polybutadiene having a rubber content of 10% by weight, and having MI of 8 g/10 min (at 200° C., under a load of 5 kg).
(C) Phosphate compound:
C-1: PX-200 (from Daihachi Chemical).
This is resorcinol bis(di-2,6-dimethyldiphenyl phosphate) having a melting point of 96° C.
C-2: PX-130 (from Daihachi Chemical).
This is tris(2,6-dimethylphenyl) phosphate having a melting point of 138° C.
C-3: TPP (from Daihachi Chemical).
This is triphenyl phosphate having a melting point of 48° C.
(D) Specific additive:
D-1: full-ester of polyglycerin (n=4) stearte.
D-2: polyethylene glycol (molecular weight: 8,000).
D-3: pentaerythritol tetrasearate.
D-4: glycerin monostearate.
(E) Fluoro-olefinic resin:
PTFE: F201L (from Dailkin Chemical Industry).
This is polytetrafluoroethylene having a molecular weight of from 4,000,000 to 5,000,000.
(F) Rubber-like elastomer:
Core/shell-type, grafted rubber-like elastomer (example 2 and 4): Metablen S2001 (from Mitsubishi Rayon).
This is a composite rubber-grafted copolymer having a polydimethylsiloxane content of at least 50% by weight.
SBS block polymer (example 6): Vector 8550-D (from Dexco Polymers), having a butadiene content of 70% by weight.
(G) Inorganic filler:
Talc: FFR (from Asada Flour Milling), having a mean grain size of 0.7 1 $\mu$m.

TESTING METHODS (1) Melt fluidity:
This is indicated by SFL (spiral flow length) as measured according to an Idemitsu method. The molding resin temperature was 240° C., and the mold temperature was 60° C. Resin samples were molded into sheets having a thickness of 3 mm and a width of 10 mm under an injection pressure of 110 MPa. The data of SFL are in terms of cm.
(2) Mold releasability:
The pressure applied to the ejector pin was measured. The pressure was at most up to 30 kg/cm$^2$. Smaller pressure measured indicates better mold releasability.
(3) Outward appearance of molding samples:
The outward appearance of molding samples was visually checked for surface roughness.
(4) Mold-deposits:
After 100 shots, the surface of the mold was visually checked for resin adhesion thereto.
(5) Izod impact strength:
Measured according to ASTM D256. The temperature was 23° C., and the thickness of samples was ⅛ inches. The data are in terms of kJ/m$^2$.
(6) Flame retardancy:
Tested according to the UL94 combustion test. Samples tested had a thickness of 1.5 mm.

TABLE 1

|  |  | Ex. 1 | Com. Ex. 1 | Com. Ex. 2 | Com. Ex. 3 | Com. Ex. 4 | Com. Ex. 5 | Ex. 2 | Ex. 3 | Ex. 4 | Ex. 5 | Ex. 6 |
|---|---|---|---|---|---|---|---|---|---|---|---|---|
| Composition |  |  |  |  |  |  |  |  |  |  |  |  |
| (A) PC |  | 80 | 80 | 80 | 80 | 80 | 80 | 84 | 70 | 84 | 100 | 70 |
| (B) | HIPS | 20 | 20 | 20 | 20 | 20 | 20 | 16 | — | 16 | — | — |
|  | ABS | — | — | — | — | — | — | — | 30 | — | — | 30 |
| (C) | C-1 | 10 | 10 | 10 | — | — | 10 | — | 12 | 8 | 10 | 12 |
|  | C-2 | — | — | — | — | — | — | 12 | — | — | — | — |
|  | C-3 | — | — | — | 10 | 10 | — | — | — | — | — | — |
| (D) | D-1 | 2 | — | — | — | 2 | — | 1 | — | 2 | 2 | — |
|  | D-2 | — | — | — | — | — | — | — | 2 | — | — | 2 |
|  | D-3 | — | — | 2 | — | — | — | — | — | — | — | — |
|  | D-4 | — | — | — | — | — | 2 | — | — | — | — | — |
| (E) | PTFE | 0.2 | 0.2 | 0.2 | 0.2 | 0.2 | 0.2 | 0.2 | 0.2 | 0.2 | 0.2 | 0.2 |
| (F) | Rubber-like Elastomer | — | — | — | — | — | — | 5 | — | 5 | — | 5 |
|  | Talc | — | — | — | — | — | — | — | — | 10 | — | — |
| Test Data |  |  |  |  |  |  |  |  |  |  |  |  |
| (1) Melt Fluidity (SFL) |  | 40 | 35 | 40 | 36 | 40 | 40 | 40 | 38 | 38 | 30 | 40 |
| (2) Mold Releasability (pressure: kg/cm$^2$) |  | 18 | not released | 18 | not released | 19 | 18 | 20 | 18 | 18 | 24 | 18 |
| (3) Outward Appearance of Moldings |  | good | rough sur-face | rough sur-face | good | good | rough sur-face | good | good | good | good | good |
| (4) Mold-deposits |  | no | no | no | yes | yes | yes | no | no | no | no | no |
| (5) Izod Impact Strength (kJ/m$^2$) |  | 34 | 18 | 16 | 38 | 35 | 30 | 65 | 60 | 60 | 30 | 70 |
| (6) UL-94 (thickness: 1.5 mm) |  | V-0 | V-1 | V-1 | V-1 | V-1 | V-1 | V-0 | V-0 | V-0 | V-0 | V-0 |

As is obvious from the data in Table 1, the flame retardancy indicated by V-0 of the flame-retardant polycarbonate resin moldings of the invention that contain the specific additive component (D) is better than that indicated by V-1 of the comparative moldings not containing it or containing a component that is similar to but differs from the component (D), when they contain the same amount of a phosphate compound of the same type. In addition, the mold releasability, the outward appearance and even the impact strength of the moldings of the invention are all better than those of the comparative moldings.

As described in detail hereinabove, the flame-retardant polycarbonate resin composition of the invention comprises a resin component of a polycarbonate resin (PC) and optionally a styrenic resin (PS), and contains a phosphate compound having a high melting point along with a specific additive component. In the composition, the phosphate compound does not deposit out and is well dispersed. Therefore, the composition is molded into good moldings having good outward appearance and good impact strength. Unexpectedly, in addition, the moldings of the composition are easy to release from molds. The moldings of the invention containing a non-halogen phosphate are preferred, as not polluting the environment. Also preferred is the composition containing both a polycarbonate resin and a styrenic resin, as its melt fluidity is much increased. As having good melt fluidity and capable of being formed into thin-walled flame-retardant articles through injection molding, the resin composition of the invention has many applications in various fields, for example, for office automation appliances, electric and electronic appliances, machine parts, car parts, etc.

What is claimed is:

1. A flame-retardant polycarbonate resin composition comprising:
   (i) 100 parts by weight of a resin or resin mixture of (A) from 20 to 100% by weight of a polycarbonate resin and (B) from 0 to 80% by weight of a styrenic resin, (ii) from 1 to 30 parts by weight of (C) a phosphate compound having a melting point of not less than 70° C. and (iii) from 0.1 to 10 parts by weight of (D) at least one member selected from the group consisting of polyglycerins having at least two repeating units, polyalkylene glycols having a molecular weight ranging from 500 to 20,000, esters of polyglycerins and $C_5$–$C_{34}$-fatty acids, esters of polyalkylene glycols and $C_5$–$C_{34}$-fatty acids and polyesters of polycarboxylic acids with polyalcohols and having a molecular weight ranging from 500 to 20,000.

2. The flame-retardant polycarbonate resin composition as claimed in claim 1, wherein the resin mixture comprises (A) from 50 to 95% by weight of a polycarbonate resin and (B) from 5 to 50% by weight of a styrenic resin, and the styrenic resin is a rubber-modified styrenic resin.

3. The flame-retardant polycarbonate resin composition as claimed in claim 1 or 2, which further contains from 0.05 to 5 parts by weight, relative to 100 parts by weight of the resin or resin mixture of (A) and (B), of (E) a fluoro-olefinic resin.

4. The flame-retardant polycarbonate resin composition as claimed in claim 1, which further contains from 1 to 30 parts by weight, relative to 100 parts by weight of the resin or resin mixture of (A) and (B), of (F) a rubber elastomer.

5. The flame-retardant polycarbonate resin composition as claimed in claim 4, wherein the rubbery elastomer (F) is a core-shell, grafted rubbery elastomer.

6. The flame-retardant polycarbonate resin composition as claimed in claim 1, which further contains from 1 to 100 parts by weight, relative to 100 parts by weight of the resin or resin mixture of (A) and (B), of (G) an inorganic filler.

7. An injection molding of the flame-retardant polycarbonate resin composition of claim 1.

8. The injection molding as claimed in claim 7, which is for housings or parts of office automation appliances, for those of information appliances, or for those of electric and electronic appliances for household use or industrial use.

9. The flame-retardant polycarbonate resin composition as claimed in claim 1, wherein said polyalkylene glycol is polyethylene glycol having a molecular weight ranging from 1,000 to 10,000, polypropylene glycol or polyethylene-polypropylene glycol having a molecular weight of 500 to 20,000 and said polyalcohol of said polyester is selected from the group consisting of ethylene glycol, propylene glycol, butanediol, glycerin, trimethylpropanol or hexanetriol.

* * * * *